United States Patent
Kasuga et al.

(10) Patent No.: US 6,513,977 B2
(45) Date of Patent: Feb. 4, 2003

(54) LINEAR GUIDE BEARING

(75) Inventors: Shinichi Kasuga, Gunma (JP); Ryoichi Sato, Gunma (JP); Hiroki Yamaguchi, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/748,381

(22) Filed: Dec. 27, 2000

(65) Prior Publication Data

US 2001/0012415 A1 Aug. 9, 2001

(30) Foreign Application Priority Data

Dec. 27, 1999 (JP) ............................................ 11-371211

(51) Int. Cl.$^7$ .............................................. F16C 29/06
(52) U.S. Cl. ........................................... 384/43; 384/44
(58) Field of Search ............................... 384/45, 43, 44

(56) References Cited

U.S. PATENT DOCUMENTS

| | | | | |
|---|---|---|---|---|
| 4,505,522 A | * | 3/1985 | Tanaka | 384/45 |
| 4,652,147 A | * | 3/1987 | Geka | 384/43 |
| 5,145,261 A | * | 9/1992 | Narumiya | 384/45 |
| 5,649,770 A | * | 7/1997 | Kuo | 384/45 |
| 5,851,073 A | * | 12/1998 | Takeuchi | 384/45 |

FOREIGN PATENT DOCUMENTS

| | | | | |
|---|---|---|---|---|
| JP | 59-103928 | | 7/1984 | .......... F16C/29/06 |
| JP | 7-208467 | | 8/1995 | .......... F16C/29/06 |
| SU | 0571633 | * | 9/1977 | |

* cited by examiner

Primary Examiner—David A. Bucci
Assistant Examiner—Julie K. Smith
(74) Attorney, Agent, or Firm—Sughrue Mion, PLLC

(57) ABSTRACT

In the present linear guide bearing, the center of curvature O' of a ball reversing passage 27 is shifted to a return side ball passage 25 side by a given amount m when compared with the center of curvature, O' of a conventional guide bearing. Due to this, not only the radius of curvature of a concave-arc-shaped groove 29 formed in each end cap 9 is reduced by a given amount m but also the concave-arc-shaped groove 29 is shifted to the return side ball passage 25 side by a given amount m, when compared with the conventional guide bearing. Thus, an angle α formed between a line connecting the leading end of a tongue portion 31 to the center of curvature O' of a ball reversing passage 27 and the moving-direction end face of a bearing main body 7, can be reduced significantly when compared with the conventional bearing.

3 Claims, 22 Drawing Sheets

LINEAR GUIDE BEARING

BACKGROUND OF THE INVENTION

1. Field of the Invention

The present invention relates to a linear guide bearing for use in an industrial robot and, in particular, to such linear guide bearing which can reduce the operating sound thereof.

2. Description of the Related Art

Recently, in a factory for manufacturing a mechanical apparatus, there have been introduced various kinds of industrial robots so that a welding operation and a painting operation can be carried out by the industrial robots instead of an operator. An industrial robot is composed of a base to be fixed to the floor surface of a factory, motion elements such as arms and wrists which are connected to each other, and various actuators for driving these motion elements. In case an actuator is initiated in response to an instruction from a control unit, the arms and wrists of the industrial robot perform linear motions or rotary motions, so that a welding gun or a spray gun mounted on the leading end of each wrist is allowed to approach and part away from a work to thereby perform a welding operation or a painting operation on the work. In the industrial robot, to allow the motion elements to perform the linear motion, it is necessary to provide not only an actuator which allows a component member (a linear motion body) on the moving side to advance or retreat with respect to a component member on the fixed side but also a rail or a linear guide bearing which is used to allow the linear motion body to slide smoothly with no play.

The linear guide bearing is mainly composed of a rail including two axially extending ball rolling grooves respectively formed on the two side surfaces thereof, a bearing main body including two load ball grooves which are respectively formed opposed to the ball rolling grooves to thereby form two load side ball passages between the ball rolling grooves and themselves, and a large number of balls respectively interposed in the load side ball passage. In the linear guide bearing, since the balls are allowed to roll along the load side ball passages, the play and resistance of the bearing main body in the moving operation thereof can be controlled down to a very low level. Because the balls move at a speed substantially half of the speed of the bearing main body, a return side ball passage must be formed in the bearing main body and, at the same time, two end caps, each of which includes an arc-shaped ball reversing passage for communicating the load side ball passage and return side ball passage with each other, must be mounted respectively on the moving-direction end portions of the bearing main body to thereby form a ball endless circulating passage. Also, referring further to the structure of each of the ball reversing passages, from the viewpoint of machining it, the outer peripheral side portion thereof is formed in its associated end cap, while the inner peripheral side portion thereof is formed in a return guide which is interposed between the bearing main body and end cap. By the way, conventionally, there is also developed a linear guide bearing in which separators (normally, disks each having an end face formed as a concave-shaped spherical surface) formed of synthetic resin are respectively interposed between the two mutually adjoining balls to thereby control noises and surface wear which are caused by the mutual collision of the balls.

However, in the above-mentioned linear guide bearing, in operation, substantial noises are produced and thus an improvement over the noise production is desired.

That is, as shown in FIG. 22, the ball 11 rolls within the load side ball passage 21 in a state where it is in pressure contact with the ball rolling groove 3 and load ball groove 23. And, in order to obtain the smooth rolling of the ball 11, the ball 11 moves with a given clearance with respect to the peripheral wall of the passage within the return side ball passage (not shown) formed in the bearing main body 7 or within the ball reversing passage 27 which is formed in the end cap 9 and return guide 33.

For this reason, when the ball 11 advances from the load side ball passage 21 into the ball reversing passage 27, or when the ball returns from the ball reversing passage 27 to the load side ball passage 21, the ball 11, which is temporarily removed from holding or restraint, collides with the peripheral wall of the ball reversing passage 27 or with the ball rolling groove 3 and load ball groove 23. Especially, the collision sound of the ball 11 with the ball rolling groove 3 and load ball groove 23 provides the major factor in the noise production. In FIG. 22, reference numeral 31 designates a tongue portion which is formed in the end cap 9. The ball 11 returning from the ball reversing passage 27 to the load side ball passage 21 is not held or restricted until it advances into the load side ball passage 21 after it parts away from the tongue portion 31. Also, reference character a designates an angle formed between a straight line connecting the center of curvature O of the ball reversing passage 27 to the leading end of the tongue portion 31 and the moving-direction end face of the bearing main body 7. Reference character R designates the radius of curvature of the ball reversing passage 27.

In order to solve this problem, in JP-59-103928U, there is proposed a linear guide bearing in which, in the boundary portion between the load side ball passage and ball reversing passage, the leading end of the tongue portion (the ball rolling groove side end portion) of the end cap is positioned in the tangent position of the ball outside diameter in the load side ball passage. With use of the linear guide bearing thus structured, when the ball moves between the load side ball passage and ball reversing passage, the ball rolls smoothly with no bump and, therefore, the linear guide bearing can be operated smoothly with good operation performance. However, in this linear guide bearing, since the ball rolling groove in the rail must be set very shallow, it is inevitable that the load capacity of the guide bearing is lowered greatly. Also, in order to eliminate a level difference between the load side ball passage and ball reversing passage, high dimensional accuracy must be secured in the ball rolling groove of the rail as well as in the tongue portion of the end cap. However, this increases the machining costs of them and lowers the yield rate of the product.

On the other hand, in the linear guide bearing, since the ball is made to move with a given clearance with respect to the peripheral wall of the ball reversing passage, the passage diameter of the ball reversing passage must be set larger than the diameter of the ball. However, this raises a fear that the moving track of the ball within the ball reversing passage can meander. Therefore, in the conventional linear guide bearing, there is produced resistance against the ball passing through the connecting portion between the ball reversing passage and load side ball passage, so that the smooth circulation of the ball can be interfered by such resistance.

In order to solve this problem, in JP-A-7-208467, there is proposed a linear guide bearing in which each ball reversing passage is composed of a pipe body to be contacted with a ball at three points to thereby restrict the meandering motion of the ball. However, in this linear guide bearing, in the portion thereof where the ball moves from the ball reversing passage to a load side ball passage, after the ball is set free from the holding of the ball reversing passage, the ball is temporarily free from any restraint until it is restricted by the load side ball passage; and, therefore, due to the above-mentioned meandering motion of the ball, the performance of the operation as well as the noise characteristic of the linear guide bearing are degraded. Also, since little clearance exists between the pipe body and ball, not only to machine the linear guide bearing is difficult but also the manufacturing cost of the linear guide bearing is increased. On the other hand, the present inventors et al. have also tried to reduce, in the load side ball passage side portion of the ball reversing passage, the clearance between the ball and the peripheral surface of such portion down to a very small one. However, it has been found that, in this case, in such portion, the smooth rotation of the steel ball along the ball passage is interfered to thereby increase the passing resistance of the steel ball.

SUMMARY OF THE INVENTION

The present invention aims at eliminating the drawbacks found in the above-mentioned conventional linear guide bearings. Accordingly, it is an object of the invention to provide a linear guide bearing which can reduce the operation noise thereof without degrading the performance of the operation thereof.

In attaining the above object, according to a first aspect of the invention, there is provided a linear guide bearing for guiding a linear motion body along a rail including two ball rolling grooves respectively so formed on the two side surfaces thereof as to extend in the axial direction thereof, the linear guide bearing comprising: a bearing main body including two load ball grooves respectively formed opposed to the ball rolling grooves to thereby form two load side ball passages respectively between the two ball rolling grooves and themselves, and two return side ball passages respectively so formed as to extend substantially in parallel to the load ball grooves; two end caps respectively fixed to the moving-direction two end faces of the bearing body, each of the end caps including a concave-arc-shaped groove for defining the outer peripheral side portion of an arc-shaped ball reversing passage which connects together the load side ball passage and return side ball passage, and a tongue portion for forming the ball rolling groove side end portion of the concave-arc-shaped groove; two return guides respectively interposed between the bearing main body and two end caps for defining the inner peripheral side portions of the two ball reversing passages; and, a large number of balls so disposed as to circulate through the load side ball passages, return side ball passages and ball reversing passages, wherein, when an angle formed between a straight line connecting the leading end of the tongue portion to the center of curvature of the ball reversing passage and the moving-direction end face of the bearing main body is expressed as $\alpha$, this angle $\alpha$ is set in the range of 5°–20°.

According to the first aspect of the invention, when the ball passes through between the ball reversing passage and load side ball passage, the distance where the ball is not restricted can be reduced down to a very small distance, thereby being able to minimize the noise caused by the collision of the ball against the peripheral wall of the ball reversing passage or against the ball rolling groove or load side ball groove.

Also, according to a second aspect of the invention, there is provided a linear guide bearing for guiding a linear motion body along a rail including two ball rolling grooves respectively so formed on the two side surfaces thereof as to extend in the axial direction thereof, the linear guide bearing comprising: a bearing main body including two load ball grooves respectively formed opposed to the ball rolling grooves to thereby form two load side ball passages respectively between the two ball rolling grooves and themselves, and two return side ball passages respectively so formed as to extend substantially in parallel to the load ball grooves; two end caps respectively fixed to the moving-direction two end faces of the bearing body, each of the end caps including a concave-arc-shaped groove for defining the outer peripheral side portion of an arc-shaped ball reversing passage which connects together the load side ball passage and return side ball passage, and a tongue portion for forming the ball rolling groove side end portion of the concave-arc-shaped groove; two return guides respectively interposed between the bearing main body and two end caps for defining the inner peripheral side portions of the two ball reversing passages; and, a large number of balls so disposed as to circulate through the load side ball passages, return side ball passages and ball reversing passages, wherein, in the load side ball passage side end portion of at least one of the return guide and bearing main body, there is formed a chamfer having an angle $\beta$ with respect to the load side ball passage, and also wherein, when an angle formed between a straight line connecting the leading end of the tongue portion to the center of curvature of the ball reversing passage and the moving-direction end face of the bearing main body is expressed as $\alpha$, a difference between $\beta$ and $\alpha$ is set to be 20° or less.

According to the second aspect of the invention, in the connecting portion between the ball reversing passage and load side ball groove, the vector of the ball in the rotation direction thereof is substantially equal to the inclination of the chamfers, so that the ball can be moved smoothly to thereby enhance the performance of the operation of the ball as well as reduce the noise thereof.

DETAILED DESCRIPTION OF THE PREFERRED EMBODIMENTS

Now, a description will be given below in detail of the preferred embodiments of a linear guide bearing according to the invention with reference to the accompanying drawings. By the way, in the following description, first to third embodiments are specifically structured based on a first aspect of the invention, whereas a fourth embodiment is specifically structured based on a second aspect of the invention.

Figure 1:
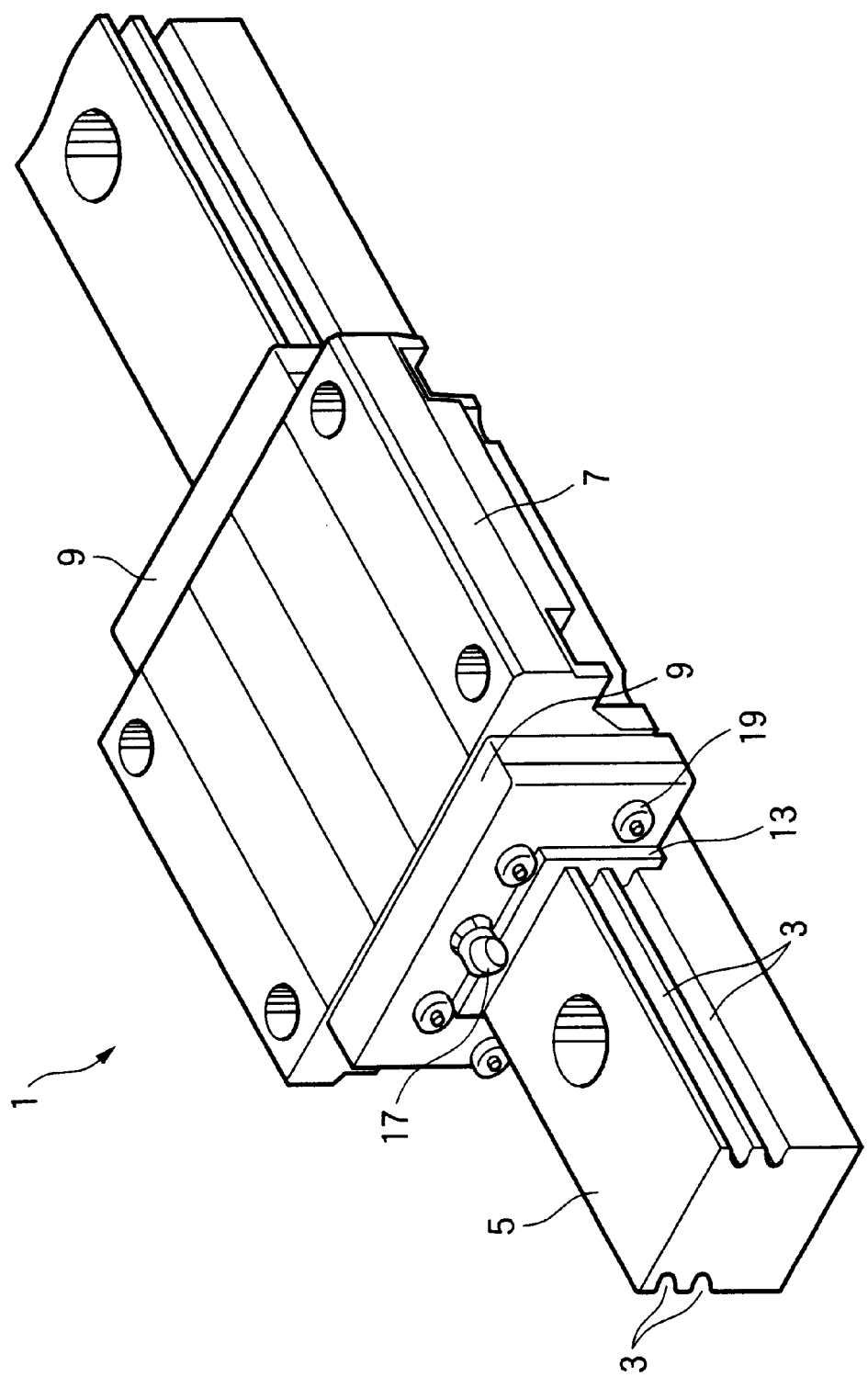
FIG. 1 is a perspective view of a linear guide bearing according to the invention.
Figure 2:
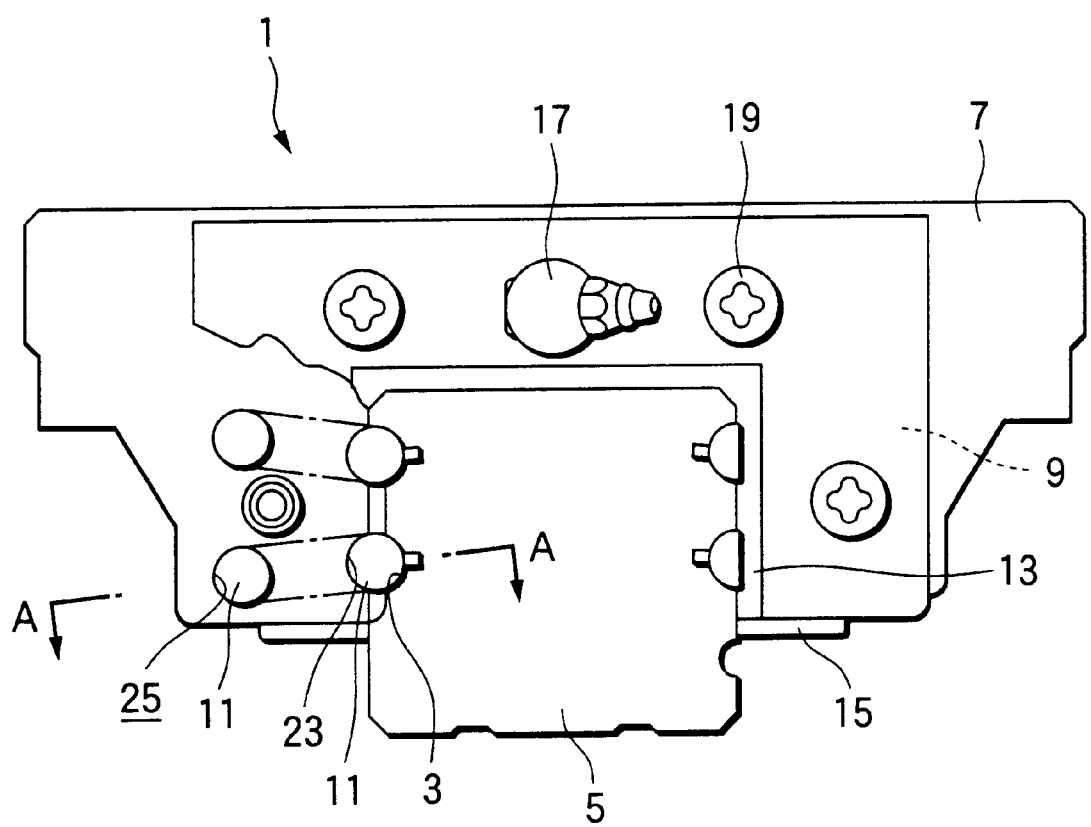
FIG. 2 is a front view of the linear guide bearing shown in FIG. 1.
Figure 3:
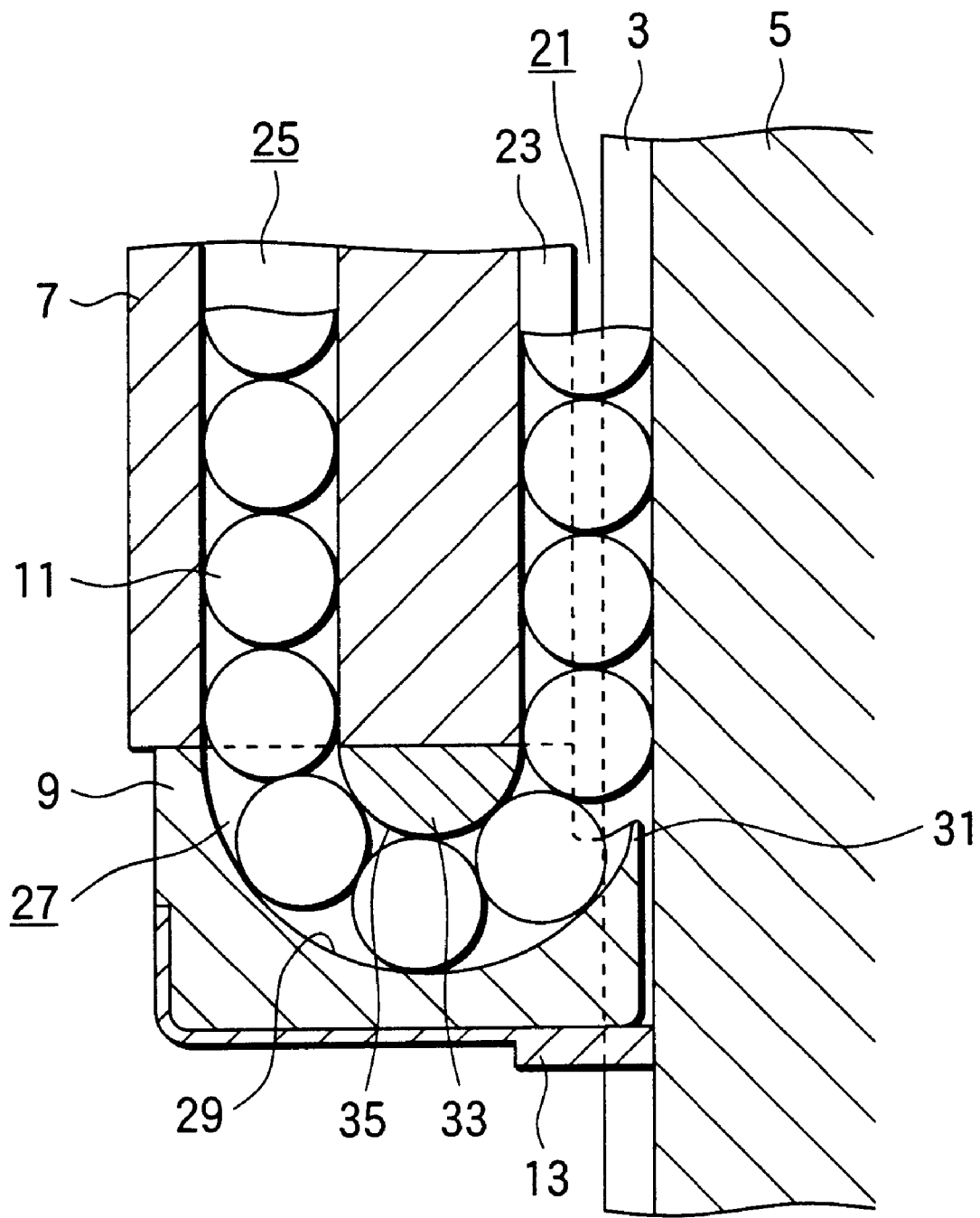
FIG. 3 is an enlarged section view taken along the lines A—A shown in FIG. 1.

FIG. 1 is a perspective view of an example of a linear guide bearing according to the invention, FIG. 2 is a front view of the present linear guide bearing, and FIG. 3 is an enlarged section view taken along the lines A—A shown in FIG. 2. As shown in these figures, a linear guide bearing 1 is used to guide a linear motion body (not shown) along a rail 5 including two upper and lower ball rolling grooves 3 respectively formed on the two side surfaces thereof. The linear guide bearing 1 mainly includes a bearing main body 7 to the upper surface of which the linear motion body can be fixed, two end caps 9 respectively fastened to the moving-direction two end faces of the bearing main body 7, and a large number of balls (steel balls) respectively held between the bearing main body 7 and two end caps 9. In these figures, reference numeral 13 designates a side seal; 15: an under seal; 17: a grease nipple; and 19: a screw.

In the bearing main body 7, there are formed two load ball grooves 23 and two return side ball passages 25. The load ball grooves are formed opposed to the two ball rolling grooves 3 to thereby form two load side ball passages 21 respectively therebetween. The return side ball passages 25 are formed to extend in parallel to the load ball grooves 23. Also, in each of the two end caps 9, there are formed a concave-arc-shaped groove 29 for defining the outer peripheral side portion of an arc-shaped ball reversing passage 27 connecting together the load side ball passage 21 and return side ball passage 25, and a projecting tongue portion 31 for forming the ball rolling groove 3 side end portion of the concave-arc-shaped groove 29.

In FIG. 3, two members (only one of them is shown in FIG. 3), which are designated by reference numeral 33, are respectively two return guides which are respectively interposed between the bearing main body 7 and two end cap 9. Each of the return guides 33 defines the inner peripheral side portion of its associated ball reversing passage 27.

Figure 4:
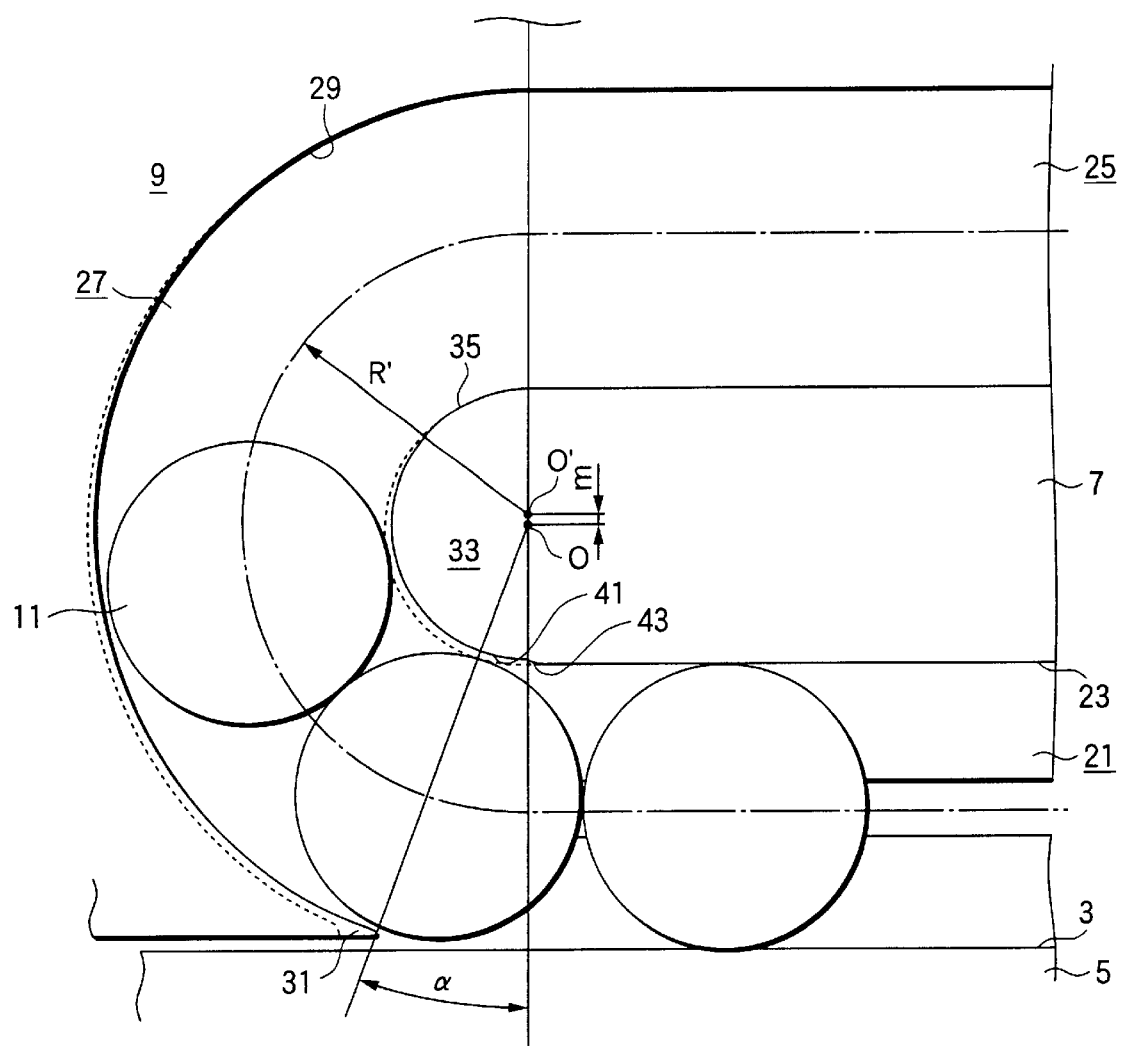
FIG. 4 is an enlarged section view of the main portions of a first embodiment of a linear guide bearing according to the invention.

Now, FIG. 4 is an enlarged section view of the main portions of the first embodiment of a linear guide bearing according to the invention. By the way, in the present and following section views which respectively show the first to fourth embodiments of the invention, in order to avoid the complicated illustration thereof, hatching is omitted.

As shown in FIG. 4, in the first embodiment as well, the basic structure thereof is similar to that of the previously described conventional linear guide bearing, but the first embodiment is different from the conventional guide bearing in the position of the center of curvature of each of the ball reversing passages 27. That is, the center of curvature O' of the ball reversing passage 27 is shifted to the return side ball passage 25 side by a given amount m with respect to the center of curvature O of the ball reversing passage 27 in the conventional guide bearing. Due to this, in the concave-arc-shaped groove 29 of each end cap 9 in the present embodiment, when compared with that shown by a broken line in the conventional guide bearing, the radius of curvature R' is reduced by a given amount m with respect to the radius of curvature R in the conventional guide bearing and is also shifted to the return side ball passage 25 side by a given amount m. As a result of this, an angle α, which is formed between a straight line connecting the leading end of the tongue portion 31 to the center of curvature O' of the ball reversing passage 27 and the moving-direction end face of the bearing main body 7, can be reduced significantly when compared with the conventional guide bearing.

In the first embodiment, due to employment of this structure, when the ball 11 moves from the ball reversing passage 27 to the load side ball passage 21, the distance where the ball 11 is not held or restricted, is reduced down to a very small distance, which weakens the collision force of the ball 11 against the ball rolling grooves 3 of the rail 5 to thereby be able to reduce the operating sound of the present guide bearing greatly. By the way, in the first embodiment, in the concave-arc-shaped groove 35 on the return guide 33 side as well, the radius of curvature thereof is reduced by a given amount m and is also shifted to the return side ball passage 25 side; and, therefore, chamfers 41, 43 are performed on the return guide 33 and bearing main body 7 so that each concave-arc-shaped groove 35 can be made smoothly continuous with its associated load ball groove 23.

Figure 5:
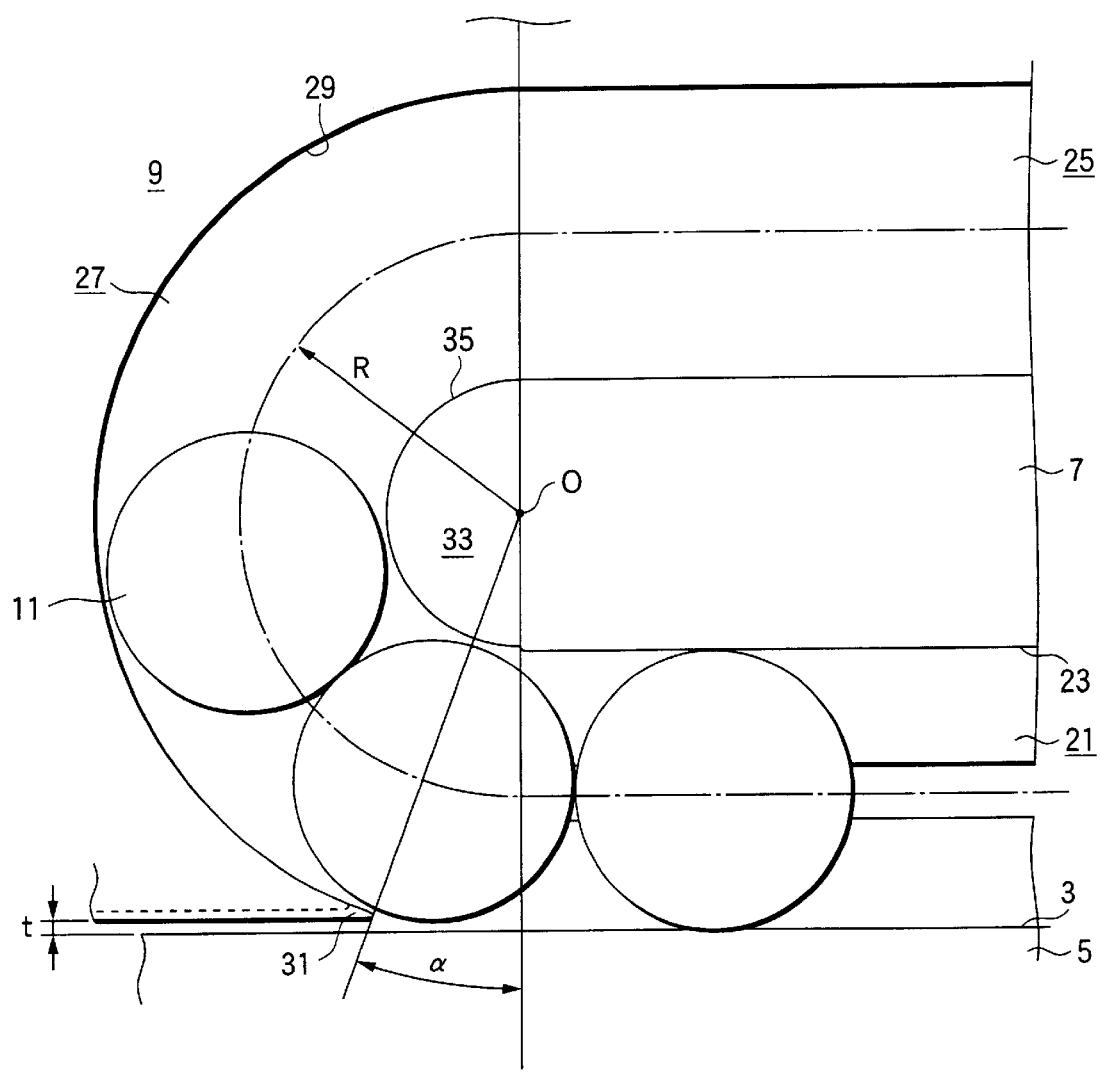
FIG. 5 is an enlarged section view of the main portions of a second embodiment of a linear guide bearing according to the invention.

Now, FIG. 5 is an enlarged section view of the main portions of a second embodiment of a linear guide bearing according to the invention.

As shown in FIG. 5, in the second embodiment as well, the basic structure thereof is similar to that of the previously described conventional guide bearing; but, in the present embodiment, the distance t between each tongue portion 31 and its associated ball rolling groove 3 of the rail 5 is narrowed. Thanks to this, an angle α which is formed between a straight line connecting the leading end of the tongue portion 31 to the center of curvature O of the ball reversing passage 27 and the moving-direction end face of the bearing main body 7, can be reduced significantly when compared with the conventional guide bearing. By the way, the operation of the present embodiment is similar to that of the previously described first embodiment.

Figure 6:
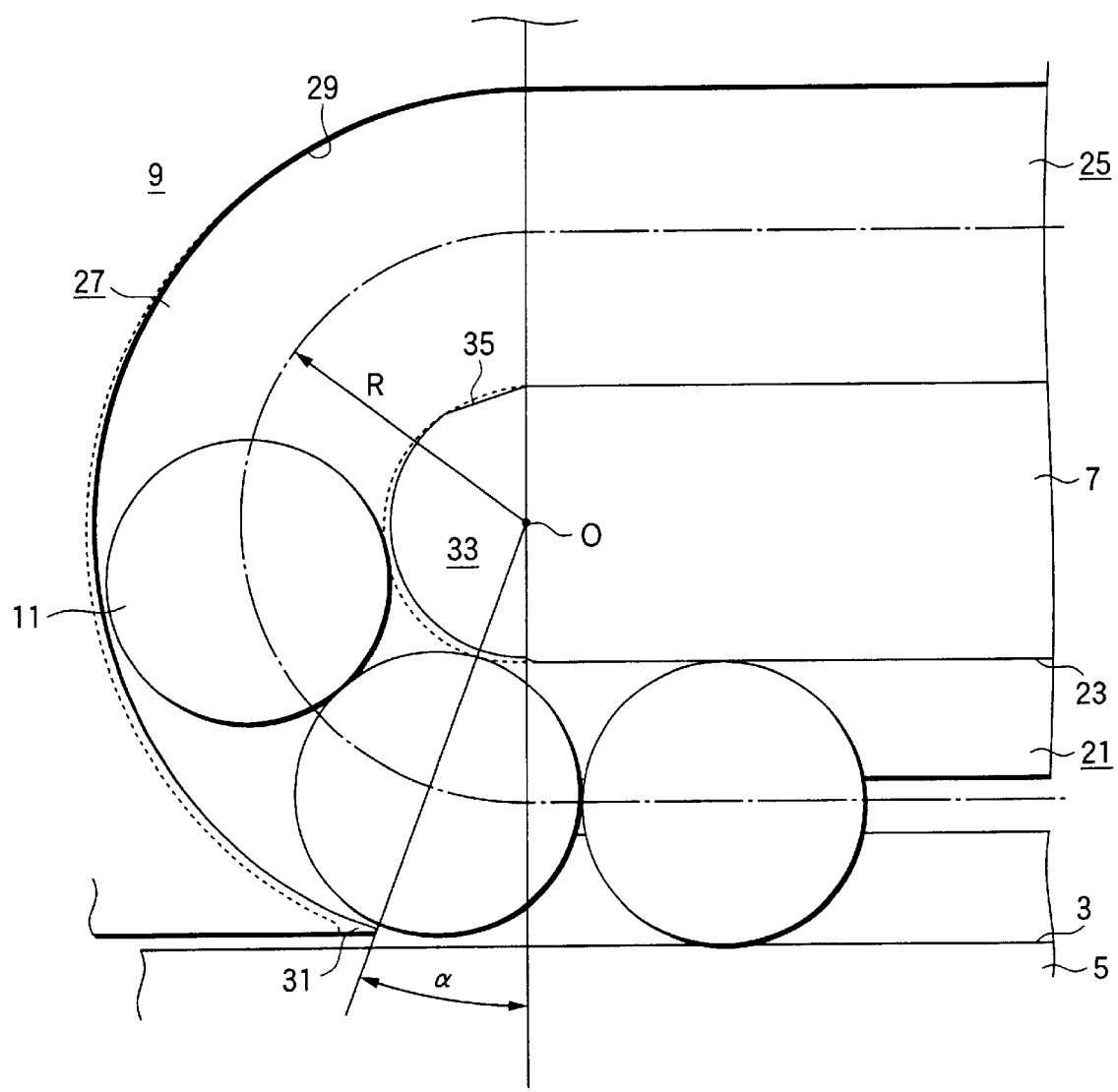
FIG. 6 is an enlarged section view of the main portions of a third embodiment of a linear guide bearing according to the invention.

Now, FIG. 6 is an enlarged section view of the main portions of a third embodiment of a linear guide bearing according to the invention.

As shown in FIG. 6, in the third embodiment as well, the basic structure thereof is similar to that of the previously described conventional guide bearing; but, the present embodiment is different from the conventional guide bearing in the radius of curvature of each ball reversing passage 27. That is, the radius of curvature R of the ball reversing passage 27 in the present embodiment is set smaller than the radius of curvature in the conventional guide bearing. Due to this, the radius of the concave-arc-shaped groove 29 of each end cap 9 can also be reduced over the radius of the conventional guide bearing shown by a broken line in FIG. 6. As a result of this, an angle α, which is formed between a straight line connecting the leading end of the tongue portion 31 to the center of curvature O of the ball reversing passage 27 and the moving-direction end face of the bearing main body 7, can be reduced significantly when compared with the conventional guide bearing. By the way, the operation of the present embodiment is similar to that of the previously described first and second embodiments.

Figure 7:
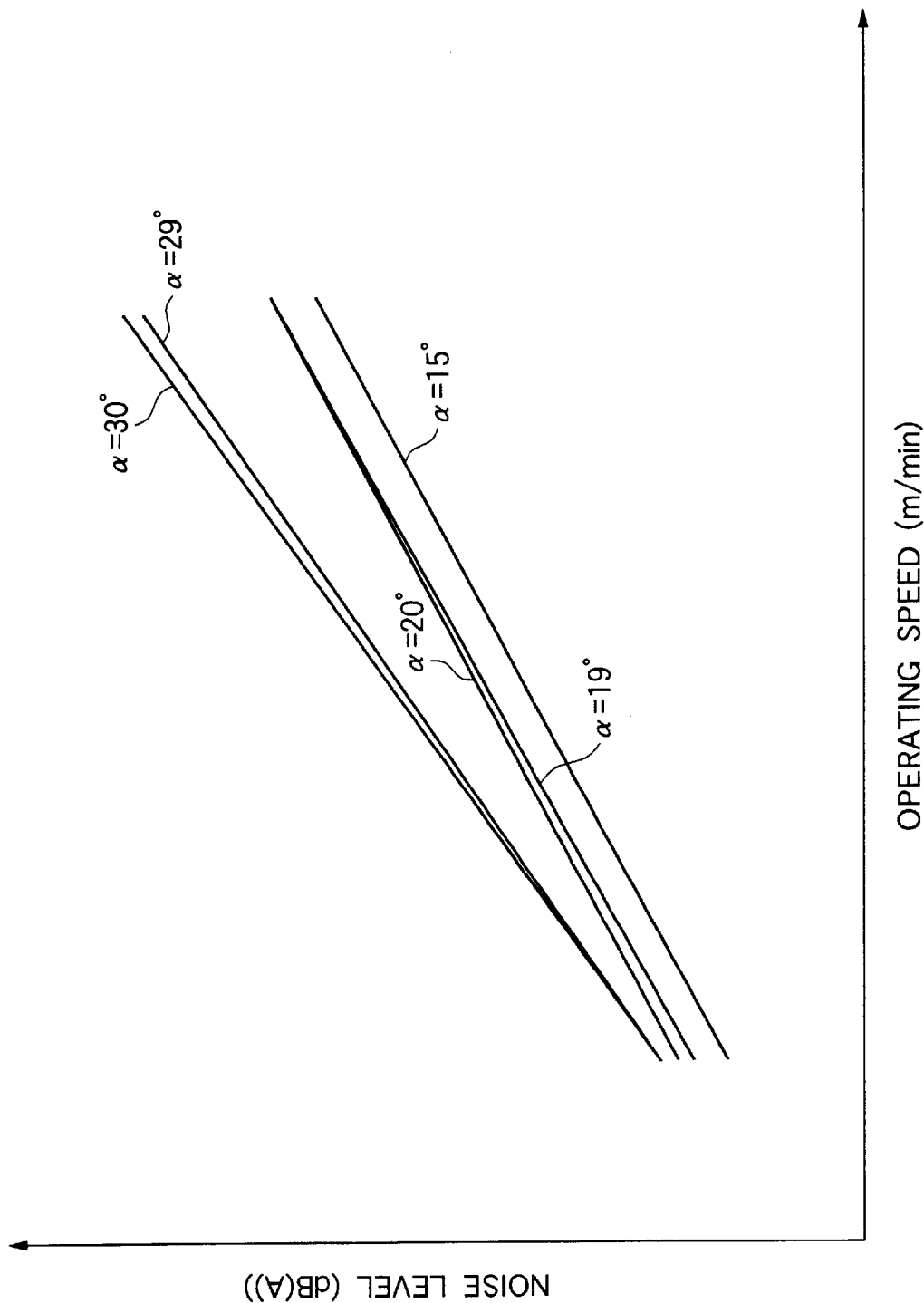
FIG. 7 is a graphical representation to explain the operations of the first to third embodiments.

In the above illustrated first to third embodiments of the invention, by reducing the angle α, the operating noise of the guide bearing can be reduced. FIG. 7 is a graphical representation of variations in the noise level (dB (A)) caused by variations in the angle α, while an operating speed (m/min - - - logarithmic expression) is used as a parameter. As can be seen from this graphical representation, various tests conducted by the present inventors et al. have confirmed that the noise level can be lowered greatly in the case of the angle α of 20° or lower. By the way, due to the dimensional errors and shape errors of the respective components and due to the combination errors thereof, in the case of the angle α of 5° or lower, the smooth rotation of the ball 11 through the bearing could not be obtained. Therefore, the angle α may be set in the range of 5°–20°.

Figure 8:
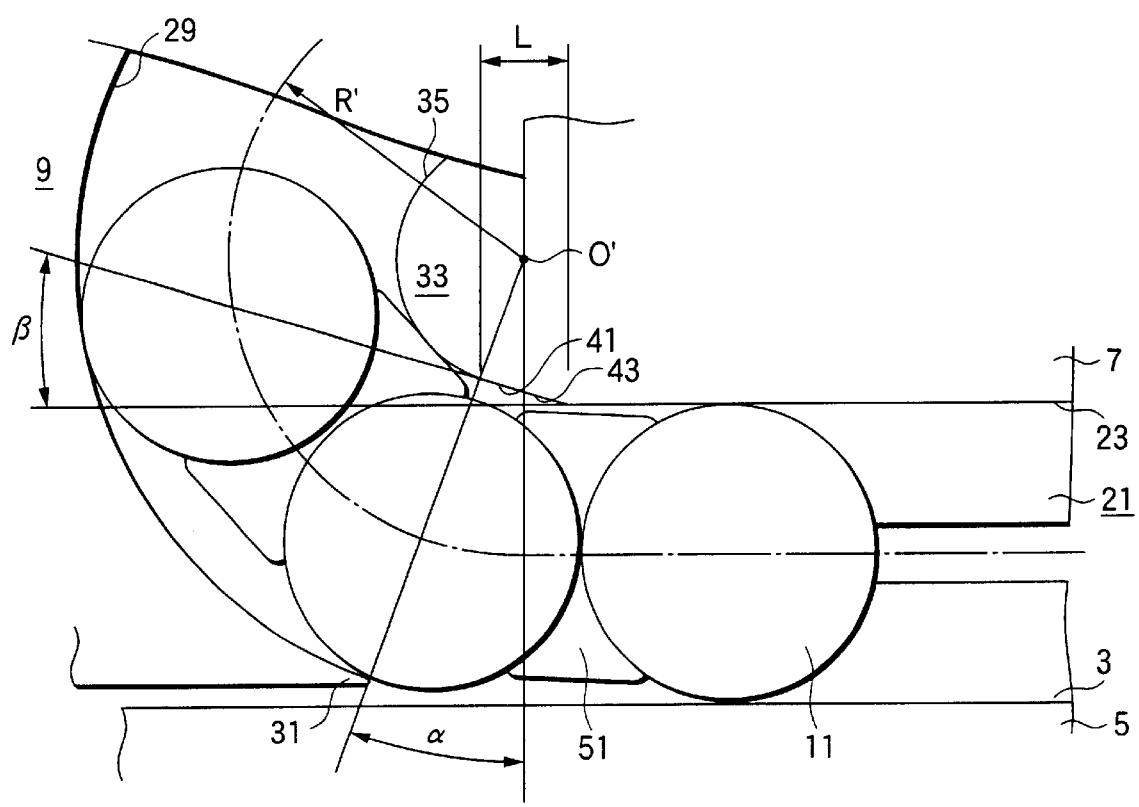
FIG. 8 is an enlarged section view of the main portions of a fourth embodiment of a linear guide bearing according to the invention.

Now, FIG. 8 is an enlarged section view of the main portions of a fourth embodiment of a linear guide bearing according to the invention.

As shown in FIG. 8, in the fourth embodiment, the basic structure thereof is similar to that of the previously described conventional guide bearing; but, in the present embodiment, between every two mutually adjoining balls 11, there is interposed a disk-shaped separator 51 which is formed of synthetic resin and includes two end faces each having a concave-shaped surface closely resembling the surface of the ball 11. Also, in the present embodiment, similarly to the first embodiment, not only the center of curvature O' of the ball reversing passage 27 is shifted to the return side ball passage 25 by a given amount but also, in order to prevent the outer periphery of the separator 51 from interfering with an inside guide member, the return guide 33 and bearing main body 7 are respectively machined so as to have chamfers 41, 43 which have an axial-direction length L and are continuous with the concave-arc-shaped groove 35 on the return guide 33 side.

In the present embodiment, when an angle which is formed between a straight line connecting the leading end of the tongue portion 31 to the center of curvature O of the ball reversing passage 27 and the moving-direction end face of the bearing main body 7, is expressed as α, this angle α is set in the range of 5°–20°. Also, when an angle of the chamfers 41, 43 with respect to the load side ball passage 27 is expressed as β, the angle β and angle α are set substantially equal to each other.

Figure 9:
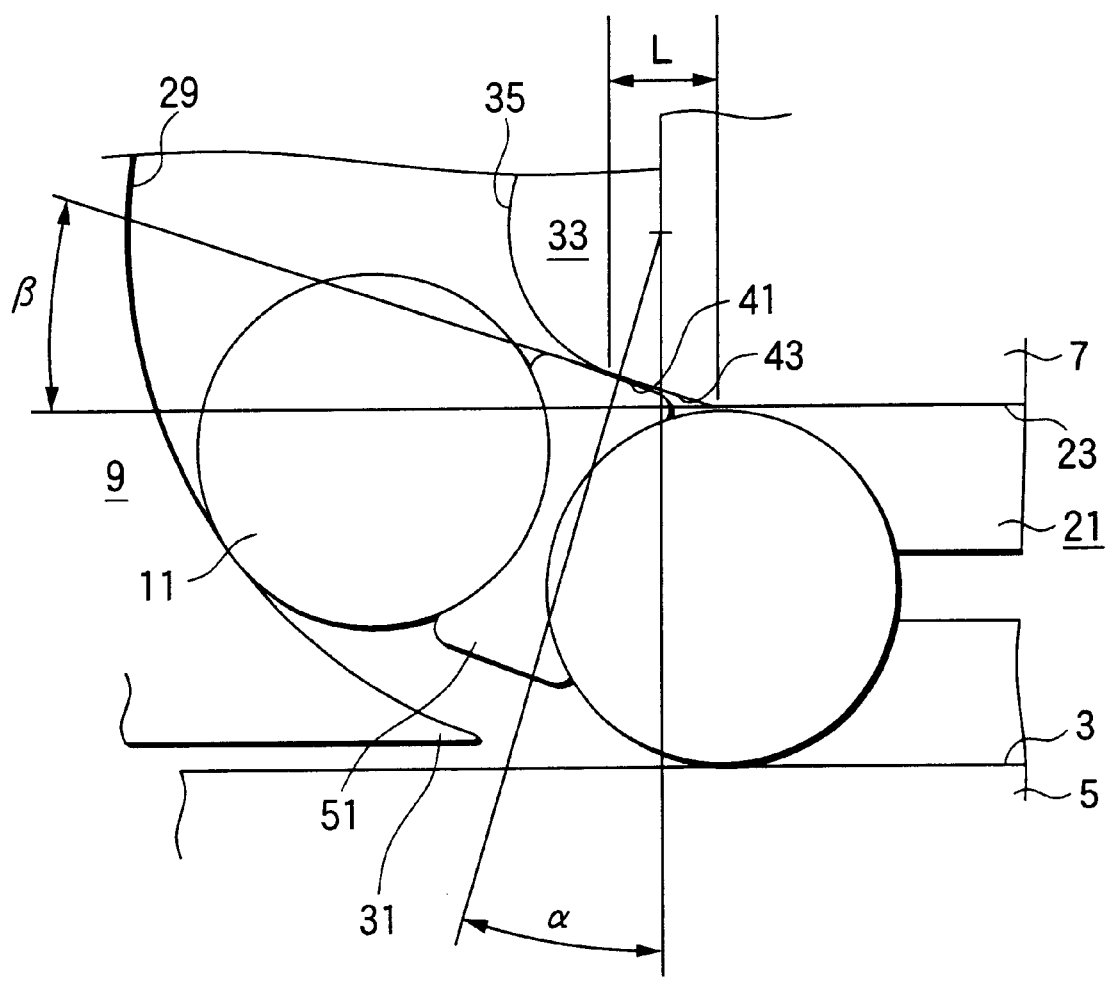
FIG. 9 is an enlarged section view of the main portions of the fourth embodiment.

According to the fourth embodiment, due to employment of this structure, in the portion where the ball 11 moves from the ball reversing passage 27 to the load side ball passage 21, the distance where the ball 11 is not held or restricted, provides a very small distance. As a result of this, the collision force of the ball 11 against the ball rolling grooves 3 of the rail is weakened to thereby be able to reduce the operating noise of the present guide bearing greatly. And, when the ball 11 passes through such portion, the vector (which is shown by an arrow mark in FIG. 8) of the ball 11 in the rotation direction thereof becomes substantially equal to the inclination of the chamfers 41, 43, thereby preventing the natural movement of the ball 11 from being interfered, so that the operation performance and noise characteristic of the present guide bearing can be enhanced greatly when compared with the conventional guide bearing. By the way, in the present embodiment, the chamfers 41, 43 are formed in both of the return guide 33 and bearing main body 7; but, alternatively, since the chamber must be formed according to the radius of curvature R of the ball reversing passage 27, such chamfer may be formed only in one of the return guide 33 and bearing main body 7. Also, in case where the outside diameter of the separator 51 is larger than the radius of curvature R of the ball reversing passage 27, as shown in FIG. 9, preferably, the length L of the chamfers 41, 43 may be set so as to be able to prevent the return guide 33 and bearing main body 7 from interfering with the separator 51 and return guide 33.

Here, the present inventors et al. have empirically analyzed such influences on the operation performance of the guide bearing that are caused when the chamfer angle β and chamfer length L are respectively varied.

Figure 10:
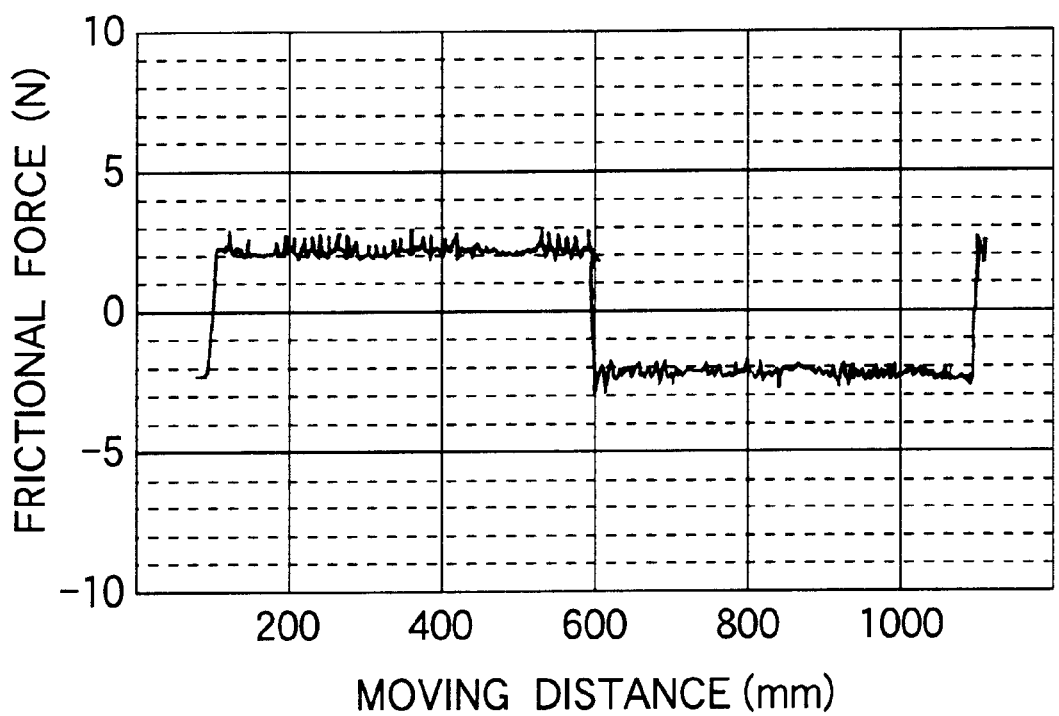
FIG. 10 is a graphical representation to explain the operation of the fourth embodiment.
Figure 11:
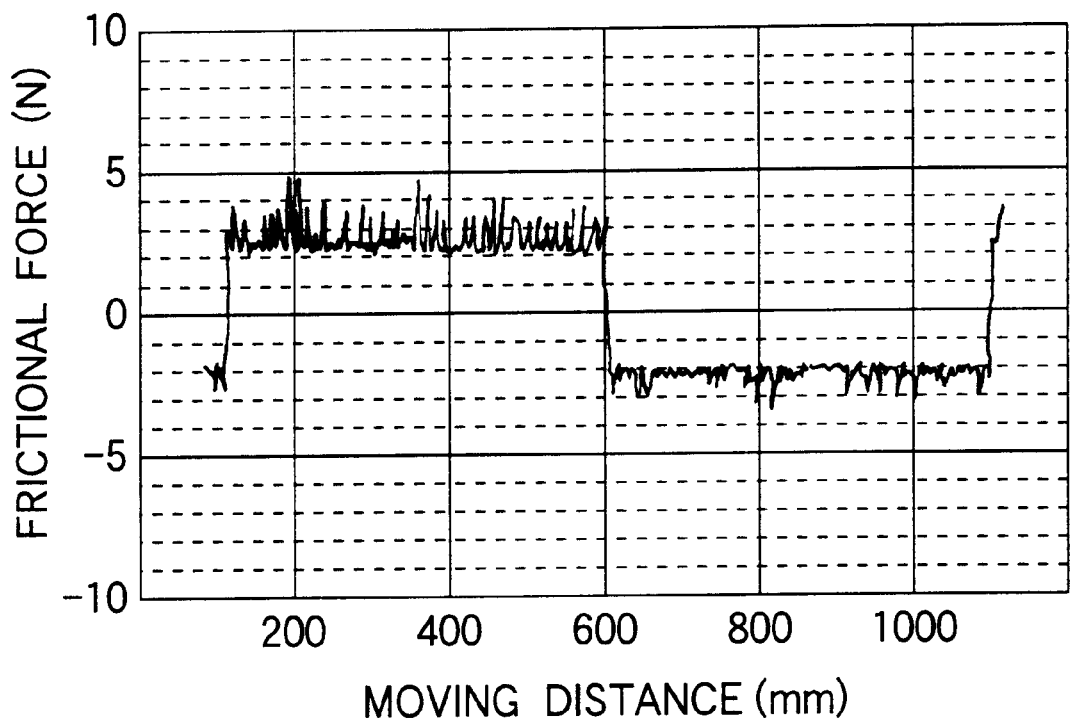
FIG. 11 is a graphical representation to explain the operation of the fourth embodiment.
Figure 12:
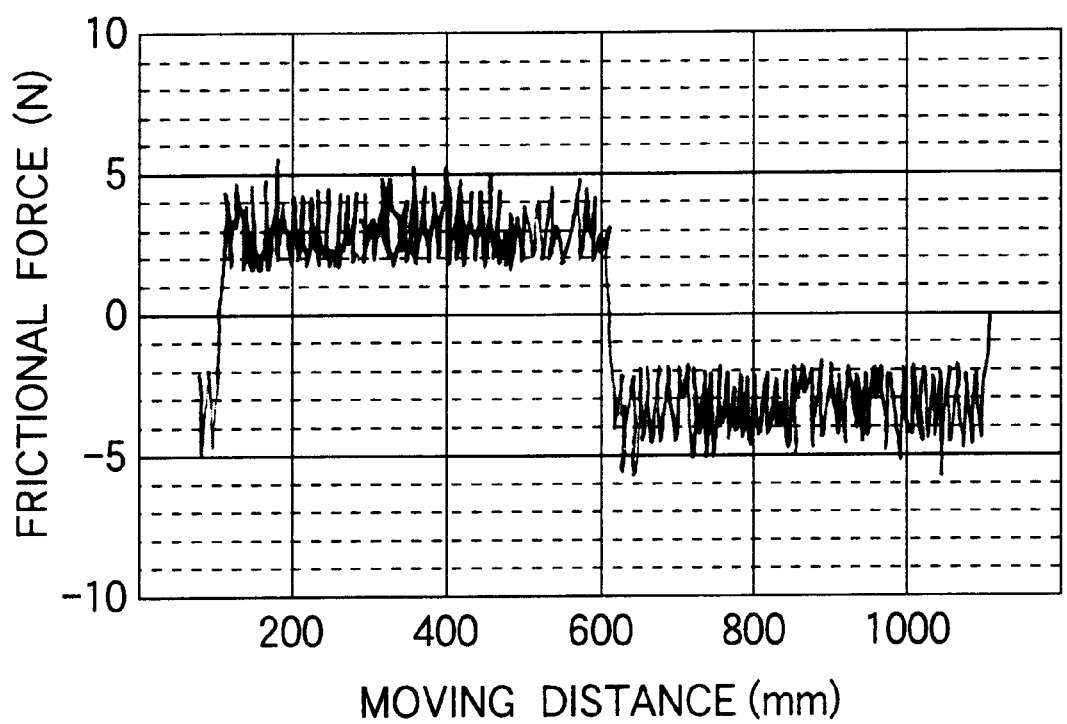
FIG. 12 is a graphical representation to explain the operation of the fourth embodiment.
Figure 13:
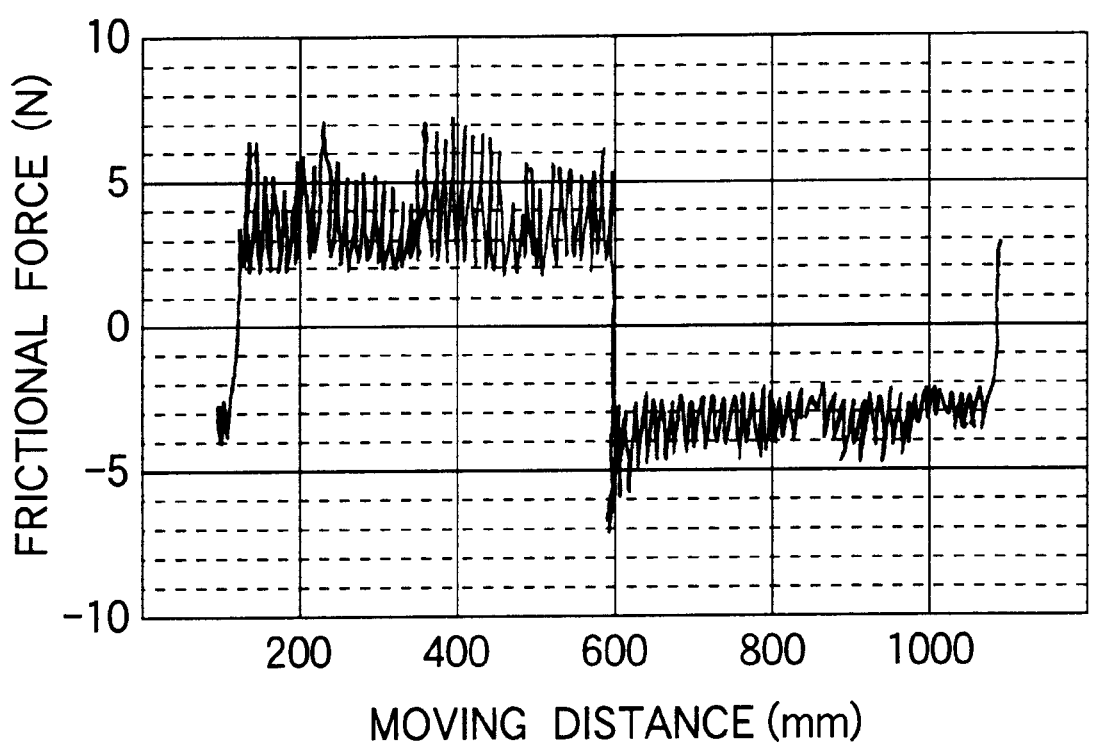
FIG. 13 is a graphical representation to explain the operation of the fourth embodiment.
Figure 14:
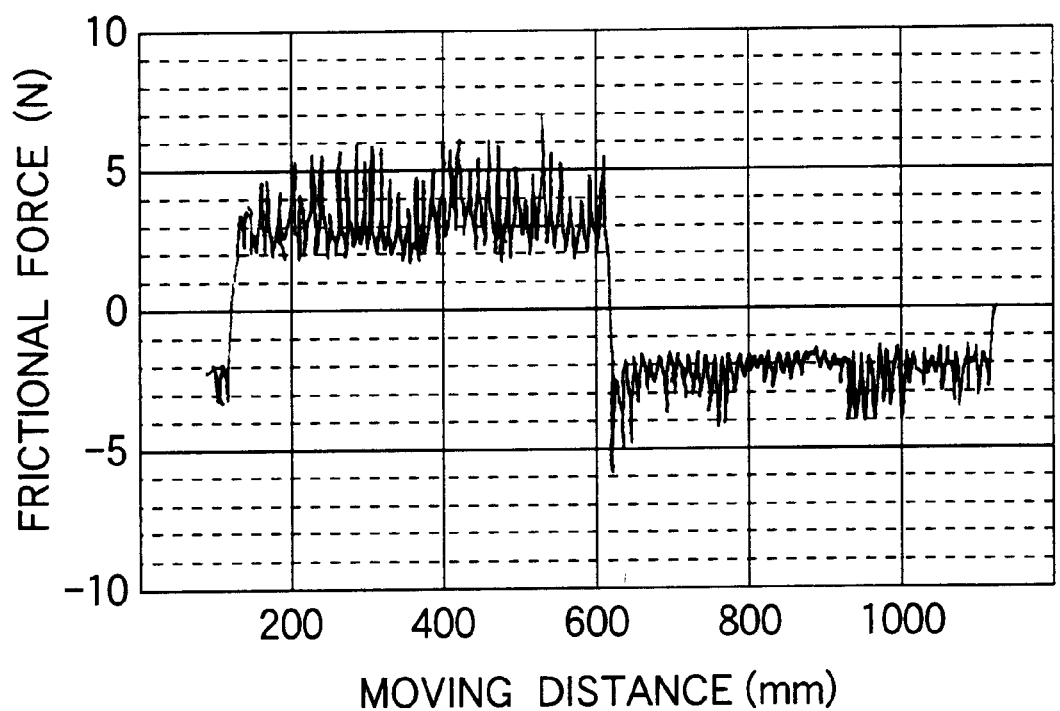
FIG. 14 is a graphical representation to explain the operation of the fourth embodiment.
Figure 15:
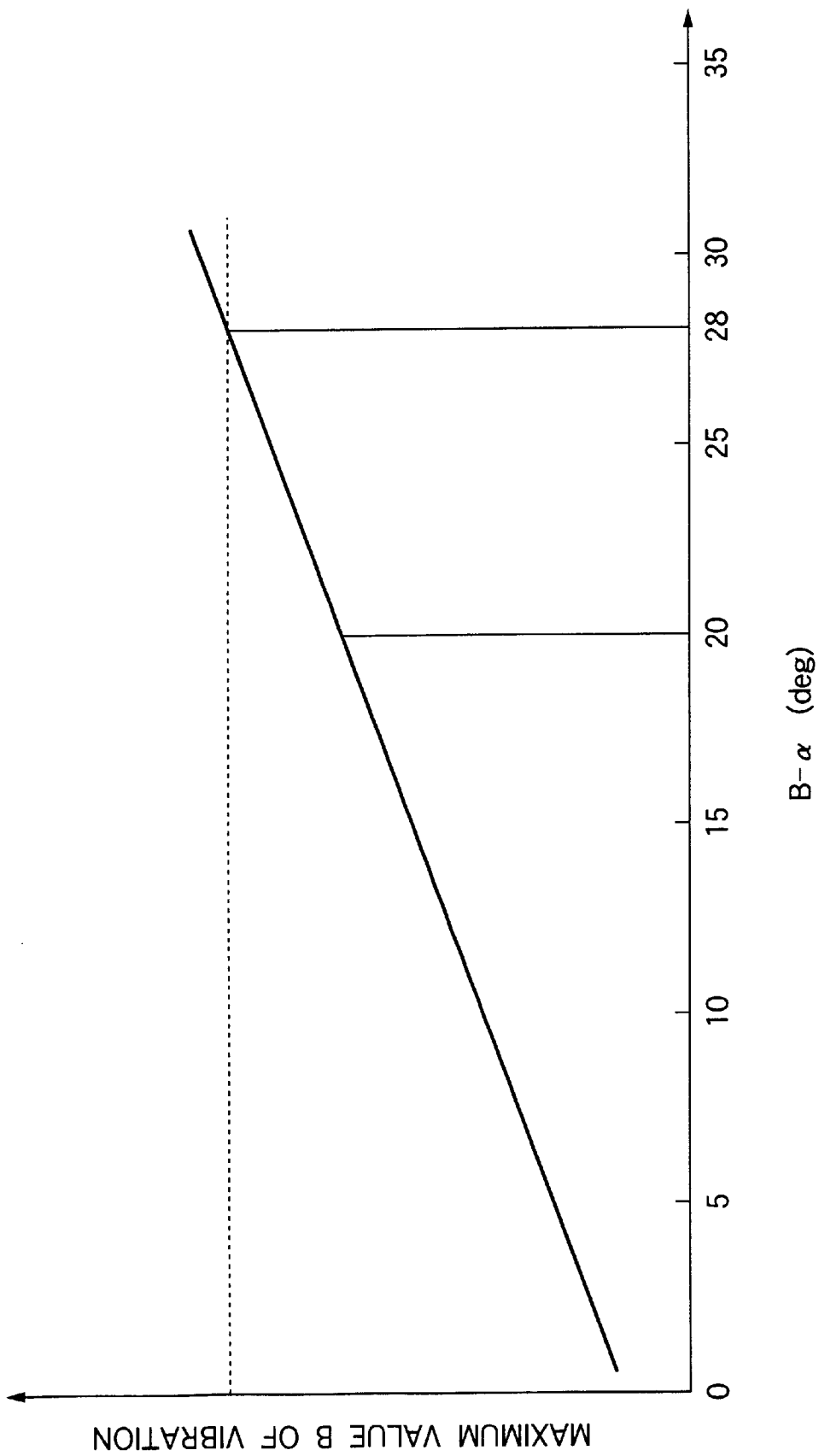
FIG. 15 is a graphical representation to explain the operation of the fourth embodiment.

Specifically, assuming that the angle α is set at 15° and the length L of the chamfers 41, 43 is set 30% of the diameter of the ball 11, using the moving distance of the linear guide bearing 1 as a parameter, the present inventors et al. have conducted a test on a frictional force given to the linear guide bearing 1 by variously varying the difference between the angles β and α. According to our test, as shown in FIG. 10 (β=α), FIG. 11 (β=α+15°), and FIG. 12 (β=α+20°), in case where the difference between the angles β and α is set at 20° or less, the maximum value B of the alternately increasing and decreasing width (which is hereinafter referred to as "vibration") of the frictional force can be controlled to a relatively low value. On the other hand, as shown in FIG. 14 (β=α+30°), in case where the difference between the angles β and α is set at more than 20°, the maximum value B of the vibrations increases suddenly and it is confirmed that no difference can be found with respect to the conventional guide bearing shown in FIG. 13 (β=α+28°). Also, FIG. 15 is a graphical representation of the relation of the difference between the angles β and α. With respect to the maximum value B of the vibrations. As shown in FIG. 15, in the case of β≦α+20°, it is confirmed that the maximum value B of the vibrations can be reduced significantly over the conventional guide bearing (shown by a broken line in FIG. 15).

Figure 16:
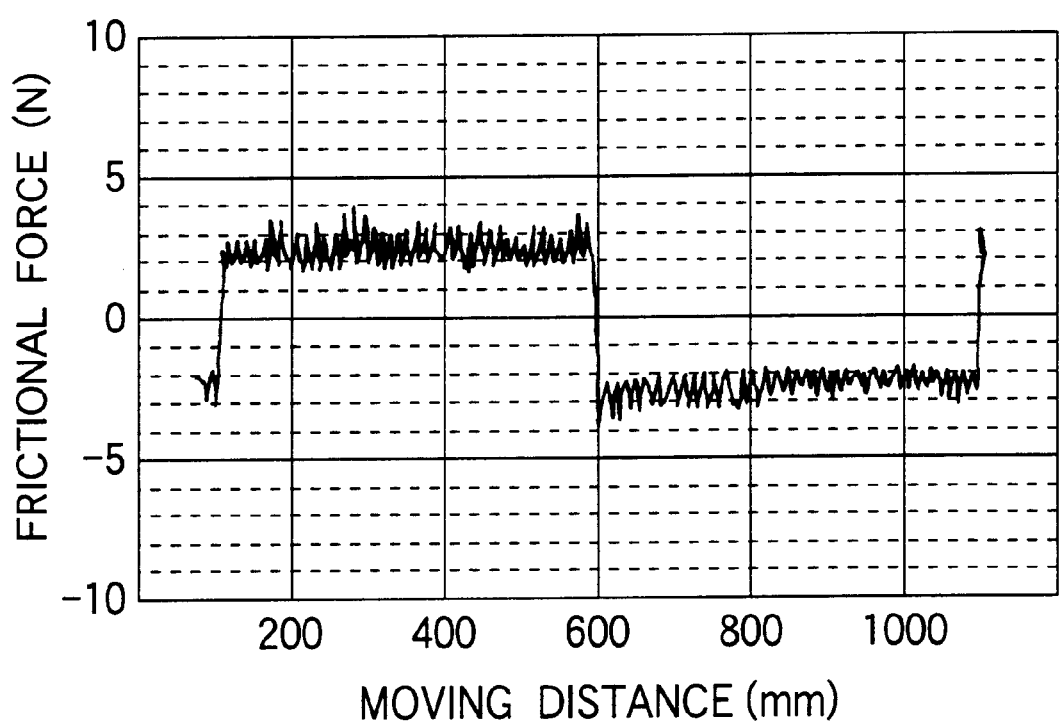
FIG. 16 is a graphical representation to explain the operation of the fourth embodiment.
Figure 17:
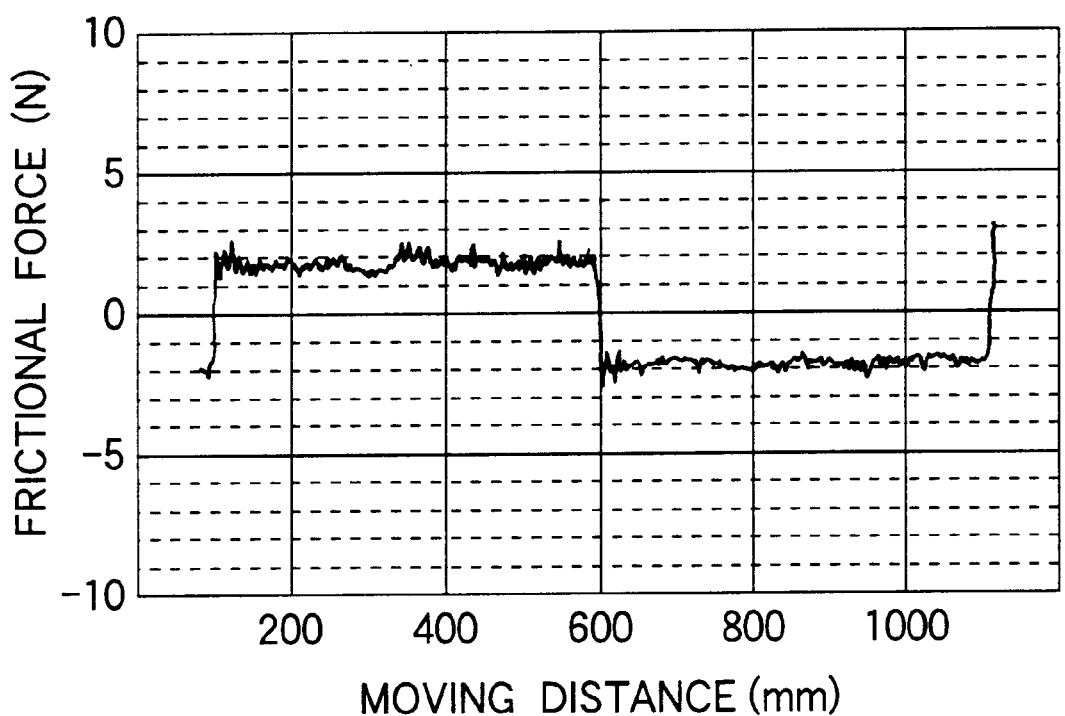
FIG. 17 is a graphical representation to explain the operation of the fourth embodiment.
Figure 18:
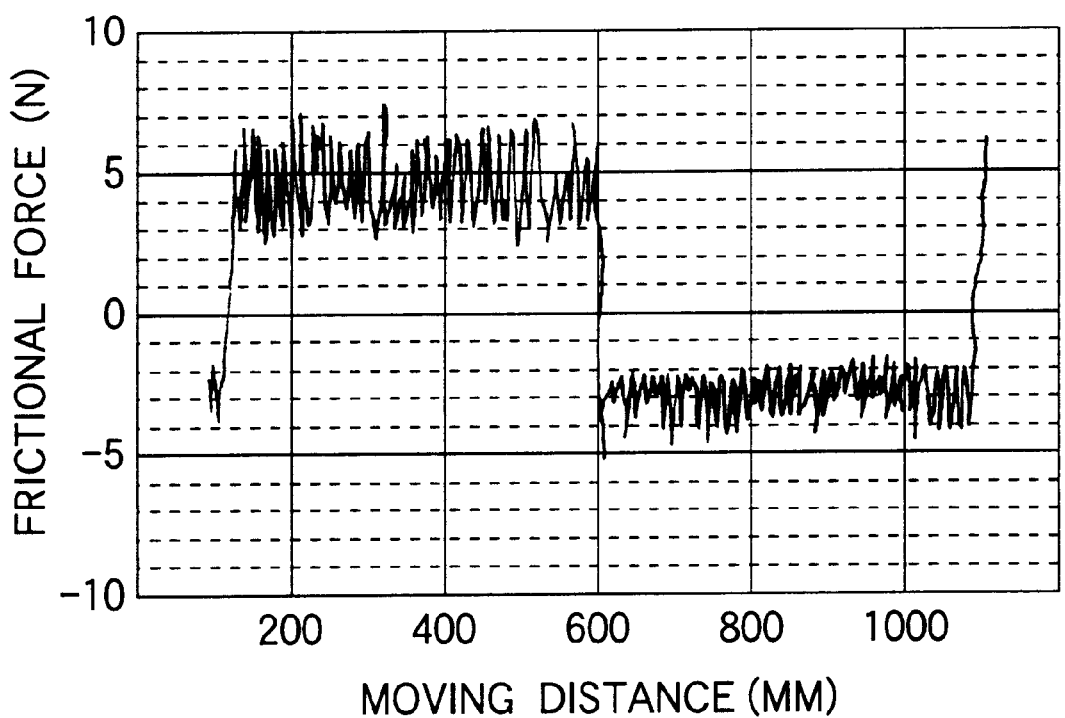
FIG. 18 is a graphical representation to explain the operation of the fourth embodiment.
Figure 19:
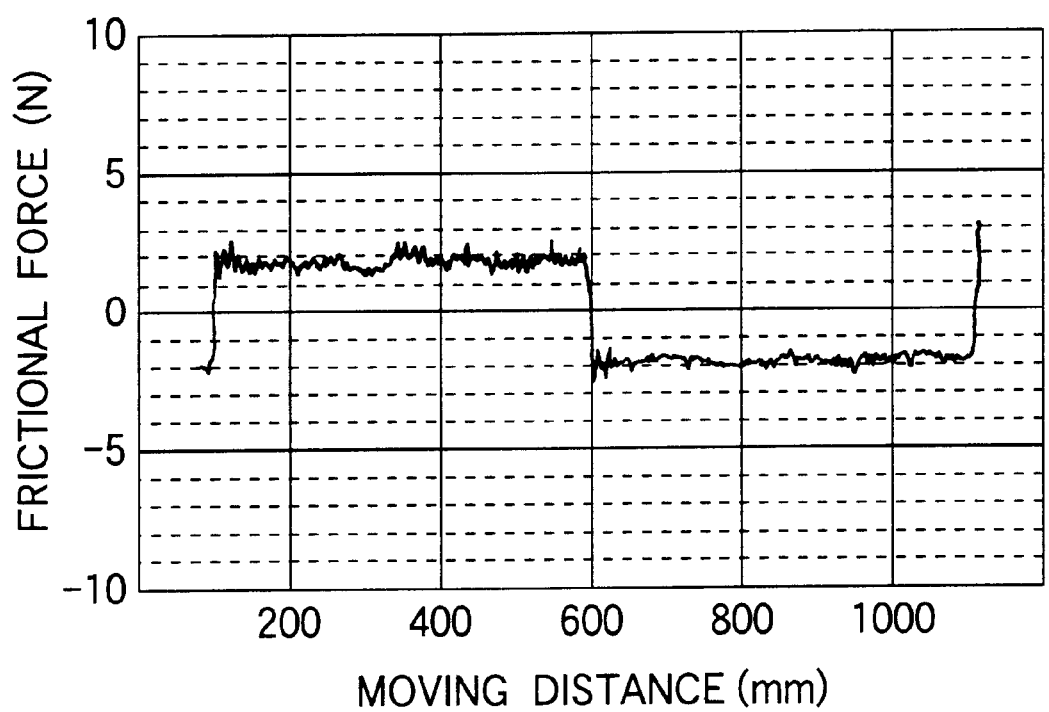
FIG. 19 is a graphical representation to explain the operation of the fourth embodiment.
Figure 20:
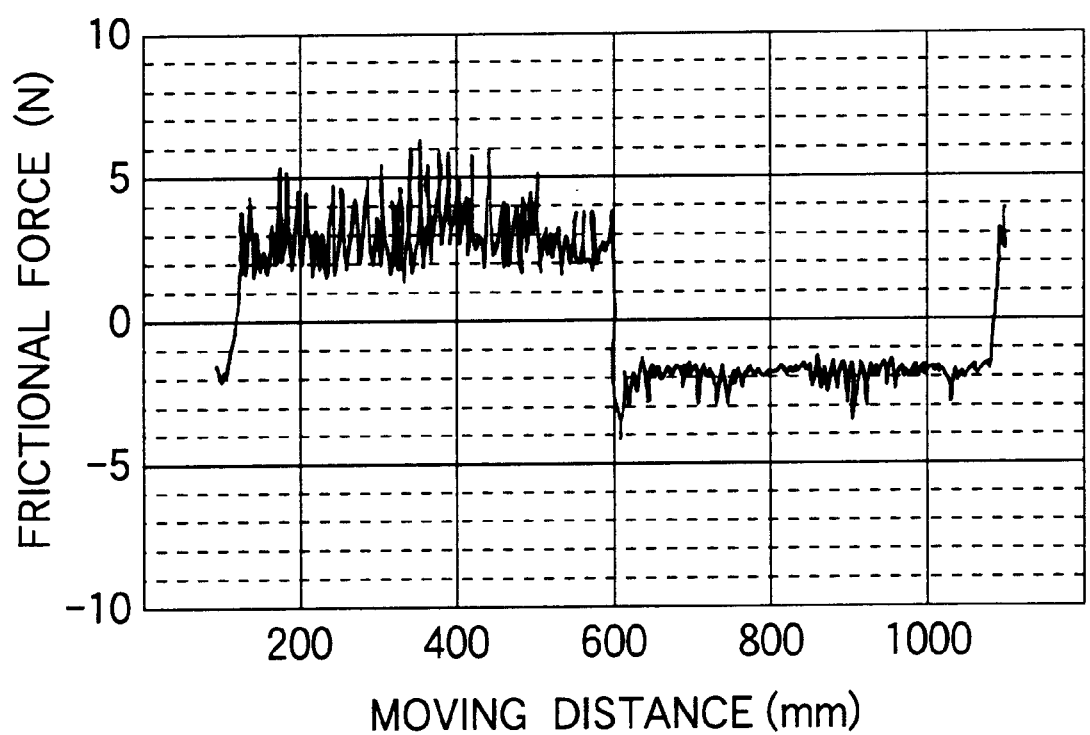
FIG. 20 is a graphical representation to explain the operation of the fourth embodiment.
Figure 21:
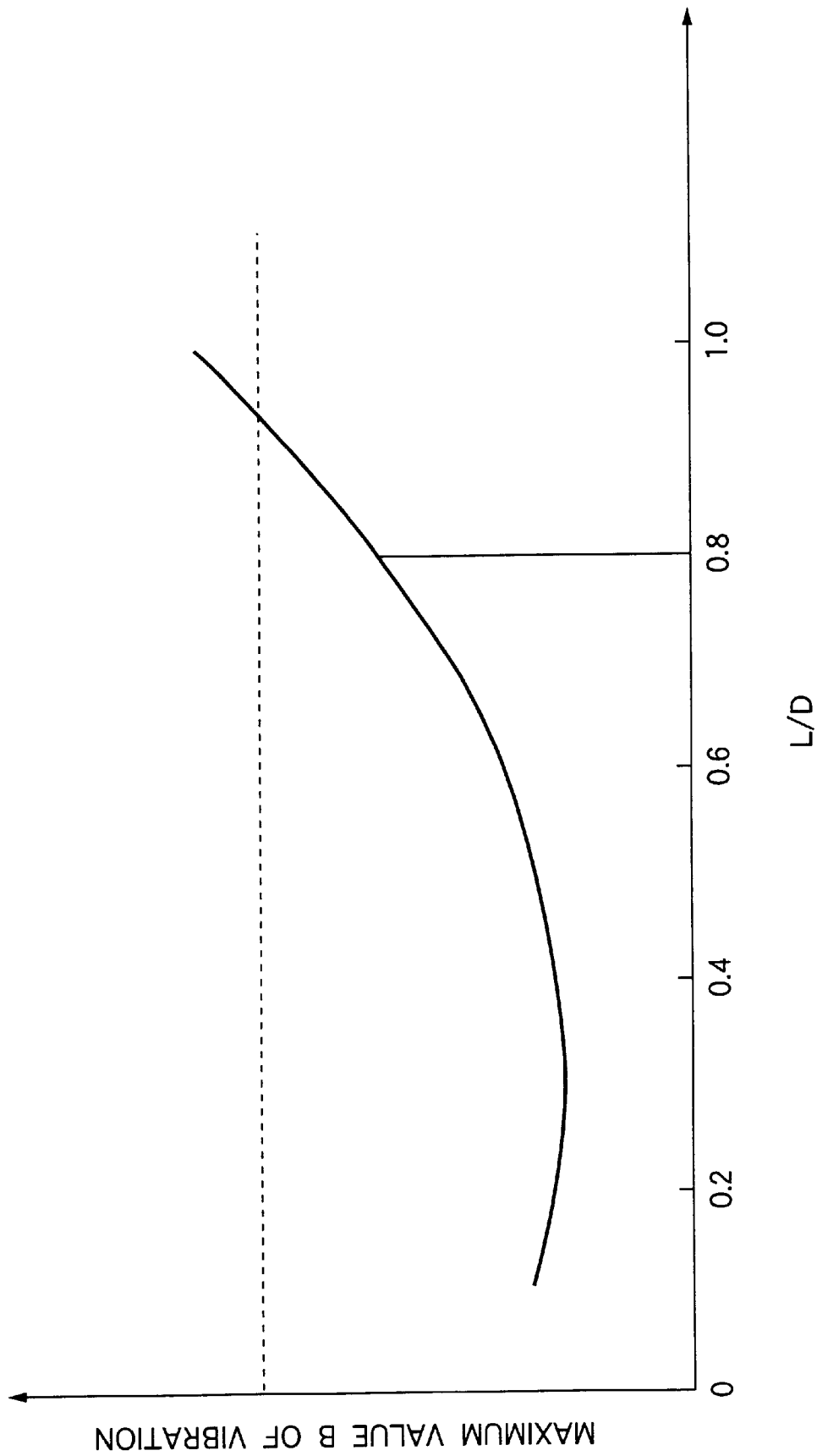
FIG. 21 is a graphical representation to explain the operation of the fourth embodiment; and, FIG. 22 is an enlarged section view of the main portions of a conventional linear guide bearing.
Figure 22:
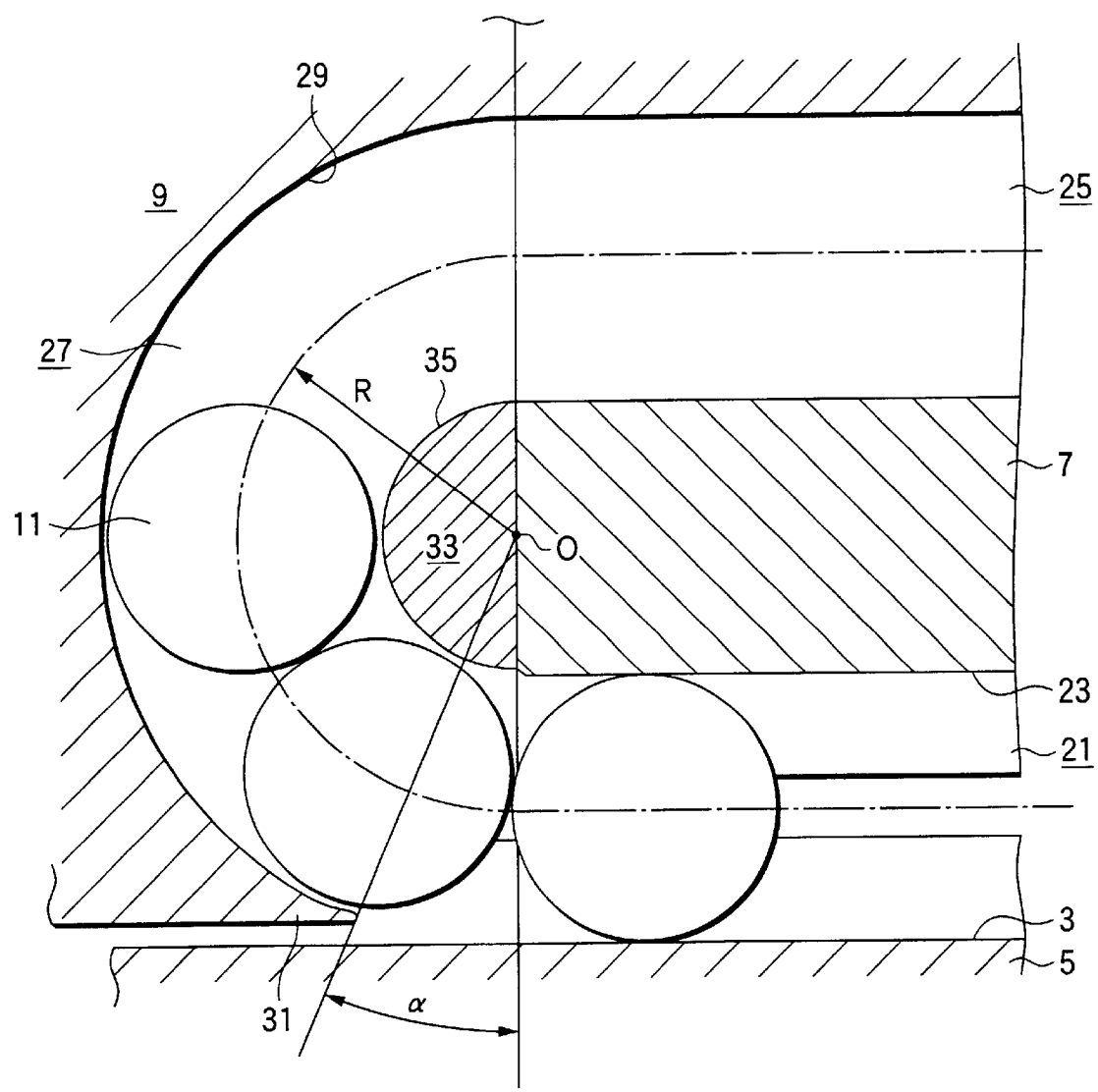

Also, the present inventors et al. conducted another test, in which, while the angles β and α were both set at an angle of 15°, with the moving distance of the linear guide bearing 1 as a parameter, the frictional forces that were applied to the linear guide bearing 1 were measured by changing the length L of the chamfers 41, 43 variously. According to this test, as shown in FIG. 16 (L=10% of the diameter D of the ball 11), FIG. 17 (L=30% of the diameter D of the ball 11), and FIG. 18 (L=80% of the diameter D of the ball 11), in case where the length L of the chamfers 41, 43 is set in the range of 80% or less of the diameter D of the ball 11, the maximum value B of the vibrations can be controlled down to a relatively small value. On the other hand, as shown in FIG. 20 (L=100% of the diameter D of the ball 11), in case where the length L of the chamfers 41, 43 is in the range of more than 80% of the diameter D of the ball 11, it can be confirmed that the maximum value B of the vibrations increases suddenly and there is found no difference with respect to the conventional guide bearing shown in FIG. 19 (L=90% of the diameter D of the ball 11). Also, FIG. 21 is a graphical representation of the maximum value B of the vibrations with respect to a ratio of the length L of the chamfers 41, 43 to the diameter D of the ball 11. According to FIG. 21 as well, in case where the length L of the chamfers 41, 43 is set in the range of 80% or less of the diameter D of the ball 11, the maximum value B of the vibrations can be reduced significantly when compared with the conventional guide bearing (in FIG. 21, shown by a broken line).

Now, this completes the detailed description of the fourth embodiment of the invention together with the results of the angles and lengths of the chamfers actually measured in our test.

By the way, in the fourth embodiment, description has been given of the structure using the separators. However, a similar tendency can be obtained even in the case of a structure which does not use the separators. Therefore, even in the case of the structure excluding the separators, the preferred ranges of the angles and lengths of the chamfers are similar to those in the structure including the separators.

Further, in the fourth embodiment, as the separator, there is used a separator which is formed of synthetic resin. However, this is not limitative but it is possible to select a proper separator, for example, a separator which is made of metal.

Now, while this completes the description of the concrete embodiments of a linear guide bearing according to the invention, the invention is not limited to the illustrated embodiments. For example, in the illustrated embodiments, there is shown the structure of a so called projection-shaped scoop-up type whose area extending from the end cap to the central portion of the tongue portion is projected. However, according to the invention, it is also possible to employ a structure of a so-called ship-bottom scoop-up type whose tongue portion is formed in a recessed shape. In this case, the leading end of the tongue portion is set at a position where the ball is removed from the holding of the end cap and can be thereby contacted with the rail. Also, the separator may also be used in the first to third embodiments as well. And, it is also possible to use not only the separators of an independent type that are illustrated in the fourth embodiment but also separators of an integral type which are connected together as an integral body. Further, the whole structure of the invention as well as the shapes of the respective components thereof can also be changed or modified properly without departing from the subject matter of the invention.

As has been described heretofore, according to the first aspect of the invention, when the ball passes through between the ball reversing passage and load side ball passage, the distance where the ball is not restricted can be reduced down to a very small distance, thereby being able to minimize the noise caused by the collision of the ball against the peripheral wall of the ball reversing passage or against the ball rolling groove or load side ball groove. Also, according to the first aspect of the invention, in the connecting portion between the ball reversing passage and load side ball groove, the vector of the ball in the rotation direction thereof is substantially equal to the inclination of the chamfers, so that the ball can be moved smoothly to thereby enhance the performance of the operation of the ball as well as reduce the noise thereof.

What is claimed is:

1. A linear guide bearing for guiding a linear motion body along a rail including a ball rolling groove formed in the axial direction thereof, said linear guide bearing comprising:

a bearing main body including a load ball groove formed opposed to said ball rolling groove to form a load side ball passage between said ball rolling groove and said load ball groove, and a return side ball passage formed such as to extend substantially in parallel to said load ball groove;

an end cap attached to a moving-direction end face of said bearing main body, said end cap including a concave-arc-shaped groove for defining the outer peripheral side portion of an arc-shaped ball reversing passage which connects together said load side ball passage and said return side ball passage, and a tongue portion forming said ball rolling groove side end portion of said concave-arc-shaped groove;

a return guide interposed between said bearing main body and said end cap to define the inner peripheral side portions of said ball reversing passages; and, a plurality of balls respectively so disposed as to circulate through said load side ball passages, said return side ball passages and said ball reversing passages, wherein, when an angle formed between a straight line connecting the leading end of said tongue portion to the center of curvature of said ball reversing passage and the moving-direction end face of said bearing main body is expressed as $\alpha$, the angle $\alpha$ is set in the range of 5°–20°.

2. A linear guide bearing for guiding a linear motion body along a rail including a ball rolling groove formed in the axial direction thereof, said linear guide bearing comprising:

a bearing main body including a load ball groove formed opposed to said ball rolling groove to form a load side ball passage between said ball rolling groove and said load ball groove, and a return side ball passage formed such as to extend substantially in parallel to said load ball groove;

an end cap attached to a moving-direction end face of said bearing main body, said end cap including a concave-arc-shaped groove for defining the outer peripheral side portion of an arc-shaped ball reversing passage which connects together said load side ball passage and said return side ball passage, and a tongue portion forming said ball rolling groove side end portion of said concave-arc-shaped groove;

a return guide interposed between said bearing main body and said end cap to define the inner peripheral side portions of said ball reversing passages; and, a plurality of balls respectively so disposed as to circulate through said load side ball passages, said return side ball passages and said ball reversing passages, wherein a chamfer having an angle $\beta$ with respect to said load side ball passage is formed in said load side ball passage side end portion of at least one of said return guide and said bearing main body, and wherein, when an angle formed between a straight line connecting the leading end of said tongue portion to the center of curvature of said ball reversing passage and the moving-direction end face of said bearing main body is expressed as $\alpha$, the difference between $\beta$ and $\alpha$ is set to be 20° or less.

3. The linear guide bearing according to claim 2, wherein the length of said chamfer in the moving direction of the linear motion body is set to be 80% or less of the diameter of said ball.

* * * * *